United States Patent [19]
Tseng

[11] Patent Number: 6,137,615
[45] Date of Patent: Oct. 24, 2000

[54] OPTICAL SCANNER WITH ADJUSTABLE RESOLUTION

[75] Inventor: Jen-Shou Tseng, ChuNan, Taiwan

[73] Assignee: Umax Data Systems Inc., Hsinchu, Taiwan

[21] Appl. No.: 09/481,401

[22] Filed: Jan. 12, 2000

[51] Int. Cl.[7] .................................................. G02B 26/08
[52] U.S. Cl. ......................... 359/196; 359/210; 359/212; 358/483; 358/497
[58] Field of Search ..................................... 359/196–226; 358/474, 483, 494, 497; 399/167, 202, 208

[56] References Cited

U.S. PATENT DOCUMENTS 5,001,768  3/1991  Mita et al. ............................... 358/455
6,064,052  5/2000  Young ................................... 250/208.1

*Primary Examiner*—James Phan
*Attorney, Agent, or Firm*—Dougherty & Troxell

[57] ABSTRACT

An optical scanner with adjustable resolution includes a casing, an optical path means, a driving means and a movable motor. The casing has a scanning path for the optical path means reciprocally moving therein for scanning. The driving means includes a belt-pulley means and a first friction wheel. The motor has an output shaft upon which a second friction wheel is mounted. The second friction wheel makes contact with the first friction wheel for driving the belt-pulley means to move the optical path means to perform scanning. The movable motor may change contact position between the first and second friction wheel and consequently change moving speed of the optical path means. As a result, the resolution of the scanner may be changed and adjusted.

15 Claims, 3 Drawing Sheets

OPTICAL SCANNER WITH ADJUSTABLE RESOLUTION

FIELD OF THE INVENTION

This invention relates to an optical scanner and particularly to an optical scanner with adjustable resolution.

BACKGROUND OF THE INVENTION

Optical scanner is a widely used computer peripheral device for image process. It has a mirror means and a charged couple device (CCD) for scanning and capturing document image, and converting the image to digital signals for computer process.

FIG. 1 illustrates a conventional scanner 1 which generally includes a casing 10, an optical path means 12, a driving means 14 and a motor 16.

The casing 10 is hollow and contains a scanning path inside such as a guide rod or rail (not shown in the figure) to enable the optical path means 12 to move along to and fro for scanning. Above the casing 10, there is a transparent document board 102 for holding a scanning document 2. Above the casing 10, there is further a cover 104 pivotally hinged with one end of the casing to cover the document 2 during scanning operation.

The optical path means 12 includes a light source 122 which may be a lamp tube, a plurality of mirror sets 124 which constitute a plurality of reflection mirrors 1241 and a lens 1243, and a CCD 126. The light source 122 projects light ray to the document 2. Document image then reflect to the reflection mirrors 1241 which direct image light to the CCD 126. The CCD 126 captures and converts image light to digital signals which are sent to computer for process.

The driving means 14 includes a close loop belt 142 wound around two pulleys 144a and 144b located at two ends inside the casing 10. The belt 142 engages with the optical path means 12. The motor 16 has an output shaft engages with the pulley 144a. When the motor 16 is activated, it drives the pulley 144a which in turn drives the belt 142 and the optical path means 12 moving to and fro within the casing 10 for scanning the document 2.

The two dimensional scanning on the document 2 is composed of multiple one dimensional straight lines. The optical path means 12 reads one line at a time then is moved to read a next line until all lines on the document are read.

The resolution of the scanner 1 depends on the image density read by the optical path means 12. DPI (dot per inch) defines the scanner resolution standard. It means the image number read by the scanner in an inch of document.

In conventional scanner, the motor rotation speed is constant. Hence the image number read by the optical path means is constant in a fixed time period. The resolution of the scanner thus is fixed and unadjustable. To adjust the resolution, the motor speed should be changed to change the scanning speed of the optical path means 12. Its cost is higher and the adjusting process is complicated.

SUMAMRY OF THE INVENITON

It is an object of this invention to provide an optical scanner with adjustable resolution for obtaining best scanning quality to suit different scanning requirements.

The scanner according to this invention includes a casing, an optical path means, a driving means and a movable motor. The casing has a scanning path located therein and a transparent document board located at the top thereof for holding scanning document.

The optical path means may be moved to and fro along the scanning path to scan and capture document image. The driving means include a belt-pulley means and a first friction wheel. The motor has a second friction wheel mounted on the output shaft. The second friction wheel makes contact with the first friction wheel. The motor is movable so that the first friction wheel contact location against the second friction wheel may be changed and result in change speed of the optical path means. Consequently the resolution may be changed and adjusted according to scanning requirements.

BRIEF DESCRIPTION OF THE DRAWINGS

The invention, as well as its many advantages, may be further understood by the following detailed description and drawings in which.

DETAILED DESCRIPTION OF THE PREFERED EMBODIMENT

Figure 1:
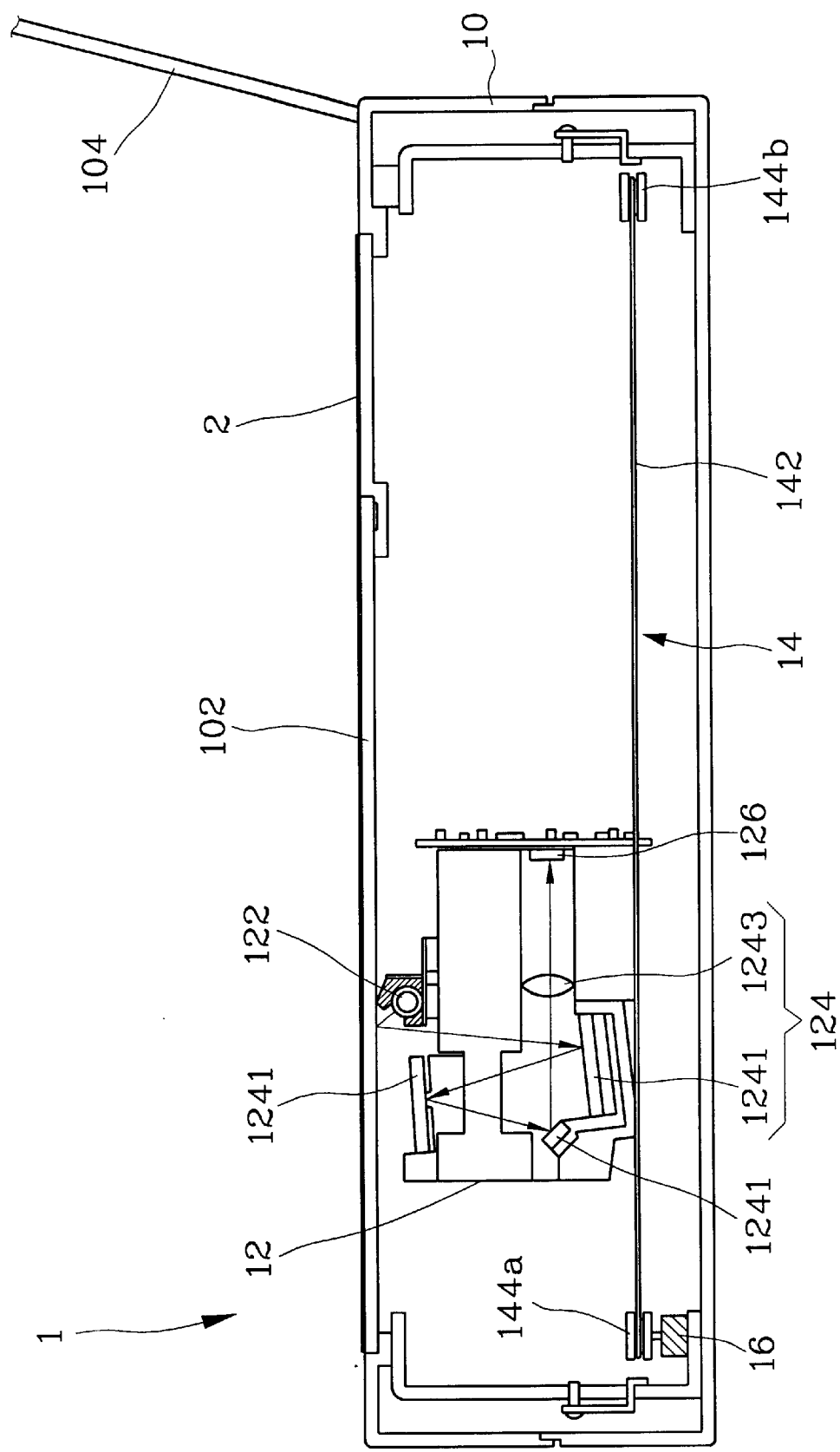
FIG. 1 is a schematic view of a conventional optical scanner.
Figure 2:
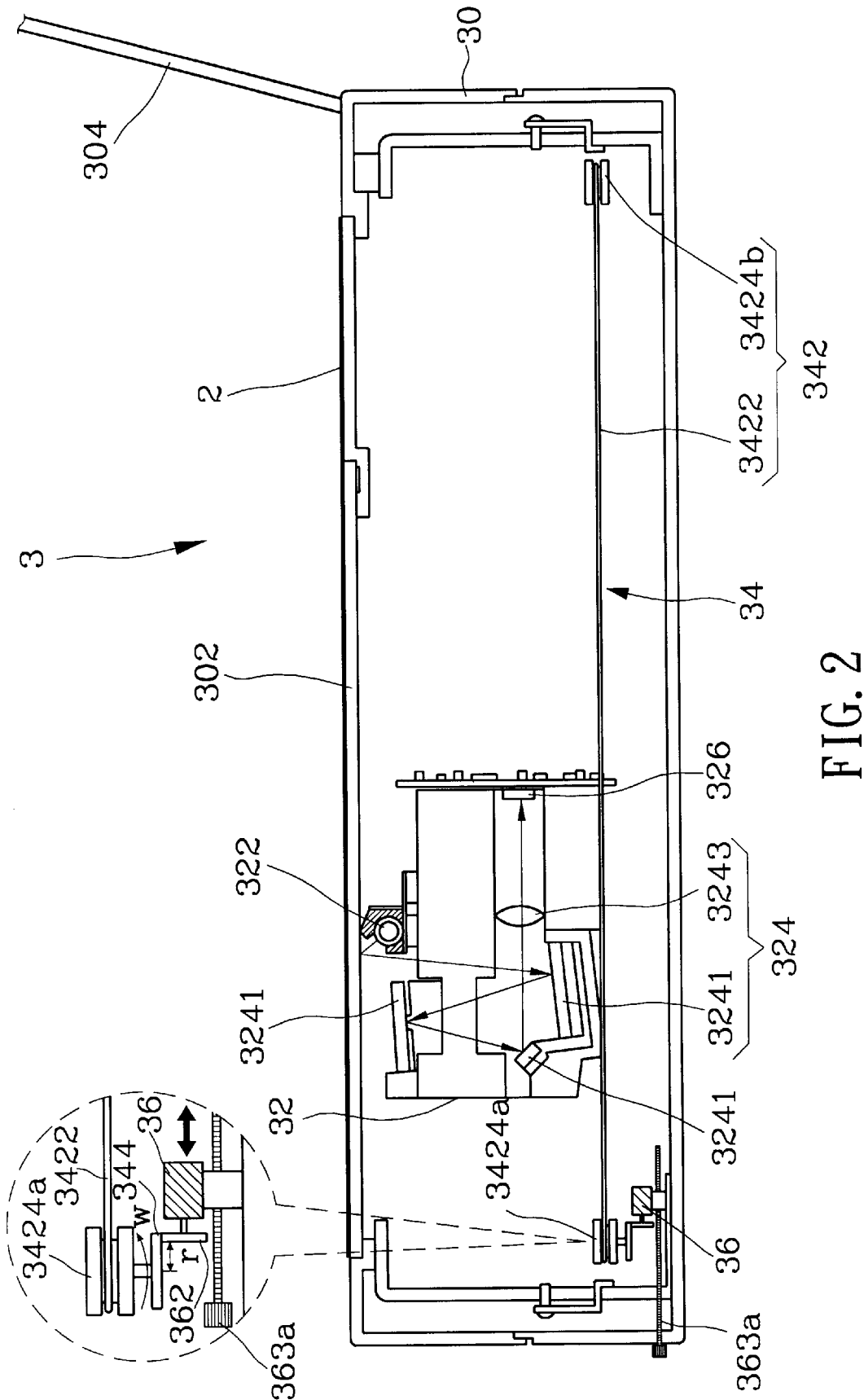
FIG. 2 is a schematic view of a first embodiment of this invention.

Referring to FIG. 2, the scanner according to this innovation includes a casing 30, an optical path means 32, a driving means 34 and a movable motor 36.

The casing 30 is hollow and has a scanning path inside to enable the optical path means 32 to move to and fro for scanning operation. At the top of the casing 30, there is a transparent document board 302 for holding scanning document 2 thereon. There is further a cover 304 hinged with one end of the casing 30 for opening to access the document 2 and may close to cover the document 2 during scanning operation.

The optical path means includes a light source 322 which may be an elongate lamp tube, a plurality of mirror sets 324 which include a plurality of reflection mirrors 3241 and a lens 3243, and a charged couple device (CCD) 326 for capturing image. The light source 322 emits and projects light ray to the document 2. Document image is reflected to the reflection mirrors 3241 and forms image light through the lens 3243. The image light then projects on the CCD 326 which converts the image light to digital signals and feeds to a computer for follow on process.

The driving means 34 includes a belt-pulley means 342 and a first friction wheel 344. The belt-pulley means 342 constitutes a close loop belt 3422 wound around two pulleys 3424a and 3424b located at two ends inside the casing 30. The belt 3422 engages with the optical path means 322. The first friction wheel 344 has a coarse surface and is mounted on the spindle of the pulley 3244a.

The motor 36 is mounted on an adjustable seat such as a screw bar 363. The motor 36 has internal screw threads (not shown in the figure) engageable with screw threads of the screw bar 363. The screw bar 363 has one end extending out of the casing 30. The output shaft of the motor 36 engages with a second friction wheel 362 which has the circumference making contact with the coarse surface of the first friction wheel 344. Rotating the screw bar 363, the location of the motor 36 may be moved and adjusted, hence the contact area of the first friction wheel 344 against the second friction wheel may be changed radically. The rotation speed of the contact area on the first friction wheel 344 is determined by the following equation:

$$V = r \times w$$

where V is the rotation speed of the motor 36, r is the radial distance between the contact area and the center of first friction wheel 344.

w is the rotation speed of the contact area on the first friction wheel 344.

As the motor rotation speed (V) is constant, when the motor 36 is moved close to the center of the first friction wheel 344. The value of (r) becomes smaller, the first friction wheel thus rotates at a greater speed and drives the belt 3422 and the optical path means 32 moving at a faster speed. The scanning speed is faster and will result in lower resolution. When the motor 36 is moved away from the center of the first friction wheel 344, the value of (r) becomes larger. The first friction wheel thus rotates at a lower speed and may result in higher resolution. By means of such arrangement and structure, the resolution of the scanner may be adjusted easily.

Figure 3:
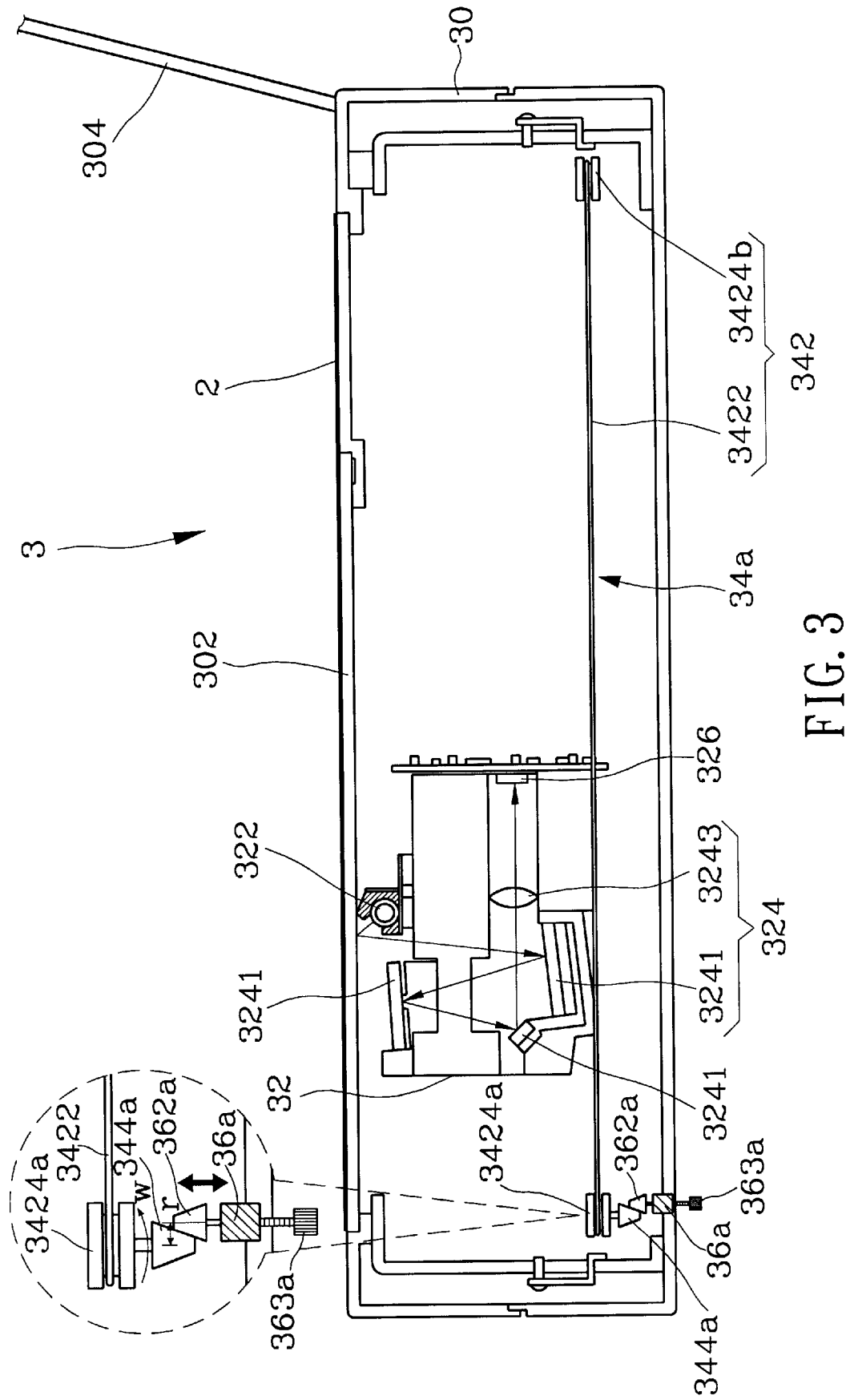
FIG. 3 is a schematic view of the second embodiment of this invention.

FIG. 3 illustrates another embodiment of this invention. It is largely constructed like the one shown in FIG. 2 except that the first and second friction wheel 344a and 362a are made in taper shape. And the output shaft of the motor 36a is parallel with the shaft of the first friction wheel 344a. The taper surface of the first and second friction wheels 344a and 362a are making friction contact. Moving the motor 36a axially, the contact area between the first and second friction wheels also change. The radial distance between the contact area and the center of the first friction wheel 344a also change. According to the equation V=r×w set forth before, the rotation speed of the first friction wheel 344a may also be changed. Hence the scanning resolution may be changed and adjusted based on the same principle set forth above.

By means of the structure of this invention, the moving speed of the optical path means, hence the scanning speed may be changed under a constant rotation motor. The resolution and DPI value may be varied and adjusted by changing the motor position. It is simple to use and low cost to produce.

It may thus be seen that the objects of the present invention set forth herein, as well as those made apparent from the foregoing description, are efficiently attainted. While the preferred embodiments of the invention have been set for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention

What is claimed is:

1. An optical scanner with adjustable resolution, comprising;

a hollow casing having a scanning path located therein and a transparent document board on a top thereof for holding a scanning document;

an optical path means movable reciprocally in the casing to perform scanning operation including a plurality of mirror sets and a charged couple device, the mirror set receiving document image and transmitting to the charged couple device;

a driving means for moving the optical path means to perform scanning including a first friction wheel; and a movable motor having an output shaft and a second friction wheel mounted on the output shaft, the second friction wheel having a circumference making contact with a surface of the first friction wheel for moving the driving means to move the optical path means to perform scanning;

wherein contact position of the first friction wheel against the second friction wheel is changeable by moving the motor such that the optical path means moving speed is also changeable for adjusting resolution of the scanner.

2. The optical scanner of claim 1, wherein the driving means including a belt-pulley means having a close loop belt wound around two spaced pulleys, the belt engages with the optical path means, one of the pulleys engages with the first friction wheel.

3. The optical scanner of claim 1, wherein the casing includes a cover for completely covering the document.

4. The optical scanner of claim 1, wherein the mirror sets includes a plurality of reflection mirrors and a lens.

5. The optical scanner of claim 1, wherein the optical path means includes a light source for scanning the document to produce document image.

6. The optical scanner of claim 1, wherein the light source is an elongate lamp tube.

7. The optical scanner of claim 1, wherein the first friction wheel has a coarse surface.

8. The optical scanner of claim 1, wherein the movable motor has an adjustable seat for moving the motor to change contact position between the fist friction wheel and the second friction wheel.

9. An optical scanner with adjustable resolution, comprising;

a hollow casing having a scanning path located therein and a transparent document board on a top thereof for holding a scanning document;

an optical path means movable reciprocally in the casing to perform scanning operation including a plurality of mirror sets and a charged couple device, the mirror set receiving document image and transmitting to the charged couple device;

a driving means for moving the optical path means to perform scanning including a first friction wheel formed in a taper shape; and a movable motor having an output shaft and a second taper friction wheel which has a taper surface making contact with a taper surface of the first friction wheel for moving the driving means to move the optical path means to perform scanning;

wherein contact position of the first friction wheel against the second friction wheel is changeable by moving the motor such that the optical path means moving speed is also changeable for adjusting resolution of the scanner.

10. The optical scanner of claim 9, wherein the driving means including a belt-pulley means having a close loop belt wound around two spaced pulleys, the belt engages with the optical path means, one of the pulleys engages with the first friction wheel.

11. The optical scanner of claim 9, wherein the casing includes a cover for completly covering the document.

12. The optical scanner of claim 9, wherein the mirror sets includes a plurality of reflection mirrors and a lens.

13. The optical scanner of claim 9, wherein the optical path means includes a light source for scanning the document to produce document image.

14. The optical scanner of claim 9, wherein the light source is an elongate lamp tube.

15. The optical scanner of claim 9, wherein the movable motor has an adjustable seat for moving the motor to change contact position between the fist friction wheel and the second friction wheel.

* * * * *